United States Patent

Kawahara

[11] Patent Number: 6,015,635
[45] Date of Patent: Jan. 18, 2000

[54] ELECTRODE FOR FUEL CELL AND METHOD OF MANUFACTURING ELECTRODE FOR FUEL CELL

[75] Inventor: Tatsuya Kawahara, Toyota, Japan

[73] Assignee: Toyota Jidosha Kabushiki Kaisha, Toyota, Japan

[21] Appl. No.: 09/176,971

[22] Filed: Oct. 22, 1998

[30] Foreign Application Priority Data

Oct. 23, 1997 [JP] Japan .................................. 9-309763

[51] Int. Cl.[7] .................................................. H01M 4/86
[52] U.S. Cl. .................................. 429/42; 429/41; 429/40; 429/122; 429/146; 427/115; 29/623.1; 29/746
[58] Field of Search ........................... 429/40, 41, 42, 429/122, 146; 427/115; 29/623.1, 746

[56] References Cited

U.S. PATENT DOCUMENTS

| | | | |
|---|---|---|---|
| 5,480,735 | 1/1996 | Landsman et al. | 429/42 |
| 5,728,485 | 3/1998 | Watanabe et al. | 429/41 |
| 5,766,788 | 6/1998 | Inoue et al. | 429/42 |
| 5,846,670 | 12/1998 | Watanabe et al. | 429/42 |

FOREIGN PATENT DOCUMENTS

| | | |
|---|---|---|
| WO92/15121 | 9/1992 | European Pat. Off. . |
| 8-88008 | 4/1996 | Japan . |

*Primary Examiner*—Bruce F. Bell
*Attorney, Agent, or Firm*—Kenyon & Kenyon

[57] ABSTRACT

In a catalyst electrode 23, a plurality of catalyst clusters 30 and a plurality of electrolyte clusters 32 are connected and entwined with each other. Each catalyst cluster 30 is formed by aggregation of a plurality of carbon particles 36 with a catalyst 34 carried thereon, and the surface of the catalyst cluster 30 is coated with an electrolyte layer 38. Each electrolyte cluster 32 is formed by aggregation of an electrolyte. A supply of ions is fed to the catalyst 34 for the electrochemical reaction via the electrolyte layer 38. The electrolyte clusters 32, on the other hand, ensure the pathway of ions moving from an electrolyte film 21 towards a gas diffusion electrode 25. This arrangement of the present invention does not require the thick electrolyte layer 38 for ensuring the sufficient transmission of ions but enables a sufficient amount of gas (oxygen) to be fed to the catalyst 34.

18 Claims, 7 Drawing Sheets

ELECTRODE FOR FUEL CELL AND METHOD OF MANUFACTURING ELECTRODE FOR FUEL CELL

BACKGROUND OF THE INVENTION

1. Field of the Invention

The present invention relates to an electrode for a fuel cell and a method of manufacturing the same. More specifically the present invention pertains to an electrode in a fuel cell that receives supplies of gaseous fuel and oxidizing gas and generates an electromotive force, wherein an electrochemical reaction proceeds with a predetermined component included in the supply of gas. The present invention also pertains to a method of manufacturing such an electrode.

2. Description of the Prior Art

Fuel cells convert the chemical energy of a fuel directly into electrical energy and are expected to attain the high energy efficiency. In a fuel cell, for example, in a polymer electrolyte fuel cell, a supply of gaseous fuel containing hydrogen and a supply of oxidizing gas containing oxygen are fed respectively to a pair of electrodes that are arranged across an electrolyte film, so that the following electrochemical reactions proceed:

$$H_2 \rightarrow 2H^+ + 2e^- \tag{1}$$

$$2H^+ + 2e^- + (\tfrac{1}{2})O_2 \rightarrow H_2O \tag{2}$$

$$H_2 + (\tfrac{1}{2})O_2 \rightarrow H_2O \tag{3}$$

Equation (1) shows the reaction proceeding on the anode in the fuel cell, Equation (2) shows the reaction proceeding on the cathode in the fuel cell, and Equation (3) shows the overall reaction proceeding in the fuel cell. These reactions generally proceed in the regions called catalyst electrodes. The catalyst electrode is disposed between the electrolyte film and a gas diffusion layer, which diffuses the supply of gas fed to the electrolyte film. The catalyst electrode includes a catalyst for accelerating the above electrochemical reaction and an electrolyte. The supply of gas is fed to the catalyst electrode via the gas diffusion layer. The above electrochemical reaction proceeds on the catalyst of the catalyst electrode by utilizing a reactive substance (hydrogen or oxygen) included in the gas. For the continuous and smooth progress of the electrochemical reaction, it is required to sufficiently diffuse the gas in the catalyst electrode, supply a sufficient amount of the reactive substance included in the gas to the catalyst, and ensure the sufficient transmission pathway of electrons and protons, which contribute to the reaction, in the catalyst electrode.

In a known structure for ensuring the sufficient progress of the reaction in the catalyst electrode, the catalyst electrode is made of a film consisting of a catalyst past containing a catalyst, an electrolytic solution, and a predetermined solvent (for example, JAPANESE PATENT LAYING-OPEN GAZETTE No. 5-507583). In this prior art technique, the catalyst paste is produced by soaking carbon fine particles with a catalyst carried on the surface thereof in an electrolytic solution containing an electrolyte having the ion-conducting ability, and this catalyst paste is dried to form the catalyst electrode. This arrangement enables the surface of the catalyst-carrying carbon granules to be homogeneously coated with the electrolyte and allows the ions required for the electrochemical reaction proceeding on the catalyst and the ions produced through the electrochemical reaction to readily move in the vicinity of the catalyst, thereby ensuring the sufficient ion-conducting ability in the catalyst electrode.

Figure 7:
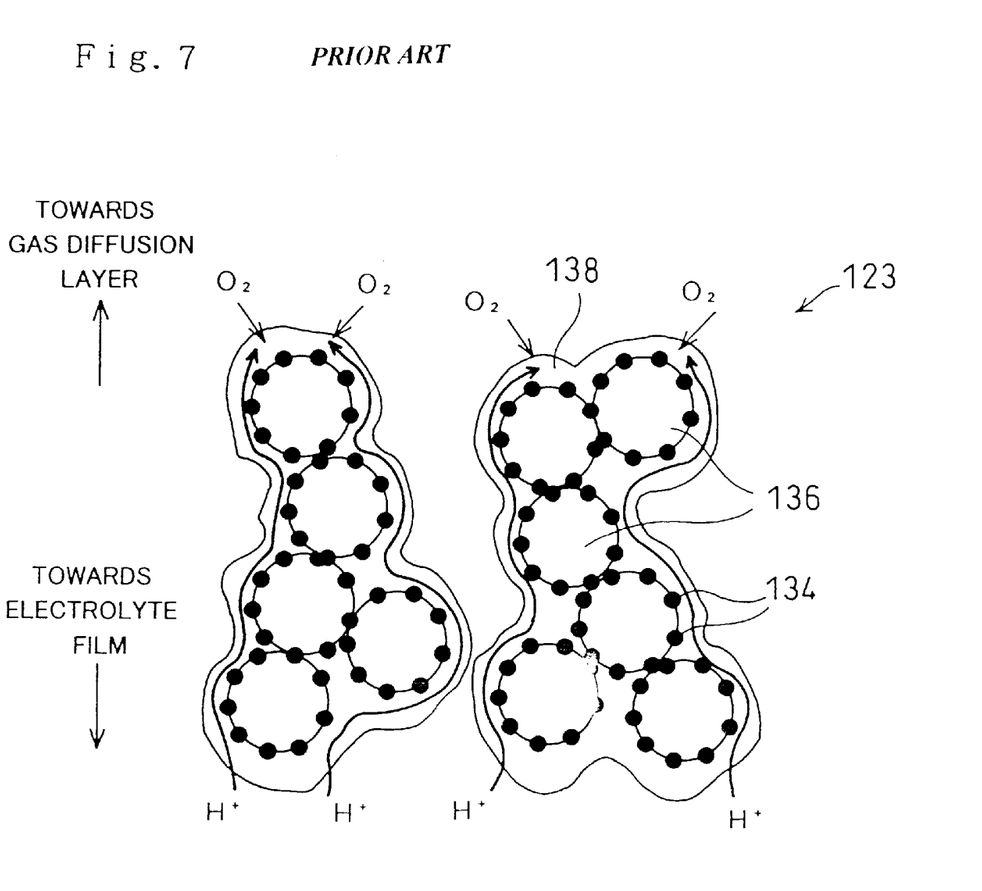
FIG. 7 schematically illustrates the structure of a catalyst electrode 123 manufactured according to the prior art technique.

FIG. 7 schematically illustrates the structure of a catalyst electrode manufactured by coating the surface of the catalyst-carrying carbon granules with the electrolyte. The drawing of FIG. 7 shows a catalyst electrode 123 functioning as the cathode as an example. In the catalyst electrode 123, the surface of each catalyst cluster, which is formed by aggregation of catalyst-carrying carbon granules 136 with a catalyst 134 carried thereon, is coated with an electrolyte layer 138. As shown in FIG. 7, in the catalyst electrode 123 functioning as the cathode, a supply of protons, which is fed from the anode and passes through the electrolyte film, is moved towards the gas diffusion layer via the electrolyte layer 138 that coats the surface of the catalyst 134. In this process, the protons are fed to the catalyst 134. A supply of electrons (not shown) is fed with oxygen molecules from the gas diffusion layer to the catalyst 134 on the surface of the catalyst-carrying carbon granules 136. The reaction of Equation (2) given above accordingly proceeds on the catalyst 134. The oxygen molecules penetrate the electrolyte layer 138 and reach the catalyst 134 on the surface of the catalyst-carrying carbon granules 136.

Another proposed method for manufacturing a catalyst electrode makes a catalyst carried on the surface of a gas diffusion electrode, applies a solution, in which solid acid particles having the ion exchange ability are dispersed, on the surface of the catalyst-carrying gas diffusion electrode, and joins the applied surface of the gas diffusion electrode with an electrolyte film, which constitutes the electrolyte layer of the fuel cell (for example, JAPANESE PATENT LAID-OPEN GAZETTE No. 6-36776). In this proposed method, formation of the layer having the ion exchange ability between the catalyst and the electrolyte film ensures the sufficient ionconducting ability in the catalyst electrode.

In the proposed structure that coats the surface of the catalyst with the electrolyte, the greater amount of the electrolyte to form the thicker electrolyte layer for coating the surface of the catalyst ensures the greater transmissible area for the ions moving in the catalyst electrode (in the case of FIG. 7, the protons moving from the electrolyte film towards the gas diffusion layer) and attains the better ion-conducting ability. The thicker electrolyte layer, however, makes it difficult for the reactant (oxygen in the case of FIG. 7) included in the gas to penetrate the electrolyte layer and reach the surface of the catalyst. Namely the thicker electrolyte layer interferes with the gas diffusion to the catalyst (that is, the supply of the reactant to the catalyst) and lowers the gas diffusion rate in the catalyst electrode. This results in lowering the contribution efficiency of the catalyst involved in the electrochemical reaction and worsening the performance of the catalyst electrode. The lowered gas diffusion rate due to the thicker electrolyte layer is prominent especially in the case of oxygen molecules, which are greater in size than hydrogen molecules. Namely the cathode is liable to be affected more significantly than the anode. The less amount of the electrolyte to form the thinner electrolyte layer for coating the surface of the catalyst improves the gas diffusion ability and enables a supply of the reactant (oxygen in the case of FIG. 7) to be fed at a sufficient efficiency to the catalyst. The thinner electrolyte layer, however, results in the insufficient ion-conducting ability and thereby lowers the performance of the catalyst electrode.

As mentioned previously, the electrolyte layer 138 forms the ion transmission path from the electrolyte film towards the gas diffusion layer. The ions passing through the electrolyte layer 138 are gradually fed to the catalyst 134 included in the catalyst electrode 123. The electrolyte layer 138 formed on the surface of the catalyst-carrying carbon granules 136 functions as the transmission path of the ions, which are fed to the catalyst 134 carried on the surface of the catalyst-carrying carbon granules 136, as well as the transmission path of the ions, which are fed to the catalyst carried on the surface of the catalyst-carrying carbon granules that are located closer to the gas diffusion layer. The less amount of the electrolyte to form the thinner electrolyte layer 138 may thus prevent a sufficient amount of ions from moving towards the gas diffusion layer and increase the resistance of the fuel cell.

The prior art technique utilizes the electrolyte for coating the surface of the catalyst to ensure the ion transmission paths, that is, both the microscopic ion transmission path in the vicinity of the catalyst included in the catalyst electrode and the macroscopic ion transmission path from the catalyst electrode to the electrolyte film. As discussed above, however, the prior art technique can not satisfy both the requirements, that is, the improvement in ion-conducting ability and the improvement in gas diffusion ability. Another problem is that a decrease in thickness of the electrolyte layer to ensure the sufficient gas diffusion ability lowers the strength of the whole catalyst layer.

SUMMARY OF THE INVENTION

The object of the present invention is to ensure sufficient gas diffusion ability and sufficient ion-conducting ability in a catalyst electrode for a fuel cell.

At least part of the above and other related objects is realized by a first electrode for a fuel cell, which includes: a plurality of catalyst particles, each catalyst particle including a catalyst carried at least on surface thereof and the surface of each catalyst particle being coated with a first electrolyte; and a plurality of electrolyte clusters, each electrolyte cluster being formed by aggregation of a second electrolyte, wherein the plurality of catalyst particles are connected with one another via the plurality of electrolyte clusters.

The first electrode for the fuel cell according to the present invention is prepared by connecting a plurality of catalyst particles with one another via a plurality of electrolyte clusters. Each catalyst particle has a catalyst at least on the surface thereof and the surface of the catalyst particle is coated with a first electrolyte. Each electrolyte cluster is formed by aggregation of a second catalyst. In this electrode for the fuel cell, the ions required for the electrochemical reaction and the ions produced through the electrochemical reaction can move through the first electrolyte that coats the catalyst particles. The plurality of electrolyte clusters ensure the ion transmission pathway between the catalyst in the electrode and an electrolyte film included in the fuel cell. The arrangement of the first electrode attains the sufficient ion-conducting ability without increasing the thickness of the electrolyte layer for coating the surface of the catalyst, and ensures the sufficient supply of the gas (the supply of the reactant required for the electrochemical reaction) to the catalyst.

The present invention also provides a second electrode for a fuel cell, which includes: a plurality of catalyst clusters, each catalyst cluster being formed by aggregation of a plurality of catalyst particles and surface of each catalyst cluster being coated with a first electrolyte, wherein each catalyst particle includes a catalyst carried at least on surface thereof, and a plurality of electrolyte clusters, each electrolyte cluster being formed by aggregation of a second electrolyte, wherein the plurality of catalyst clusters are connected with one another via the plurality of electrolyte clusters.

The second electrode for the fuel cell according to the present invention has the following effects, in addition to the effects similar to those of the first electrode for the fuel cell according to the present invention. Electrons move smoothly in the catalyst clusters formed by aggregation of a plurality of catalyst particles. This ensures the sufficient electron-conducting ability in the whole electrode for the fuel cell. Carbon particles with the catalyst carried on the surface thereof may be used as the catalyst particles. Although metal particles containing a catalyst metal may also be used as the catalyst particles, the carbon particles with the catalyst carried thereon are preferably used to ensure the sufficient catalytic surface area and electron-conducting ability.

The present invention is also directed to a first fuel cell including an electrode, wherein the electrode is produced by connecting a plurality of catalyst particles containing a catalyst with one another via a plurality of electrolyte clusters containing an electrolyte. Each catalyst particle includes the catalyst carried at least on surface thereof and the surface of each catalyst particle being coated with a first electrolyte. Each electrolyte cluster is formed by aggregation of a second electrolyte.

The present invention is further directed to a second fuel cell including an electrode, wherein the electrode is produced by connecting a plurality of catalyst clusters containing a catalyst with one another via a plurality of electrolyte clusters containing an electrolyte. Each catalyst cluster is formed by aggregation of a plurality of catalyst particles, and surface of each catalyst cluster is coated with a first electrolyte, wherein each catalyst particle includes the catalyst carried at least on surface thereof. Each electrolyte cluster is formed by aggregation of a second electrolyte.

In the first and the second fuel cells according to the present invention, it is not required to increase the thickness of the electrolyte layer formed on the surface of the catalyst in the electrode of the fuel cell. This arrangement ensures the sufficient gas diffusion ability to the catalyst (that is, the sufficient supply of the reactant to the catalyst). Even in the case of an increase in output current of the fuel cell, this arrangement enables the electrochemical reaction to proceed at a sufficient level and thereby ensures a sufficient output voltage. The plurality of electrolyte clusters ensure the sufficient ion transmission pathway between the catalyst and an electrolyte film of the fuel cell and thus enable the internal resistance of the fuel cell to be kept at a sufficiently low level.

The present invention provides a first method of manufacturing an electrode for a fuel cell. The first method includes the steps of: (a) soaking a plurality of catalyst particles, which include a catalyst at least on surface thereof, in a first electrolytic solution, which is prepared by dissolving a first electrolyte in a solvent, and drying the soaked catalyst particles, so as to cause the surface of the catalyst particles to be coated with the first electrolyte; (b) in a second electrolytic solution, which is prepared by dissolving a second electrolyte in a solvent, modifying the state of dissolution of the second electrolyte, so as to make the second electrolyte deposit and form a plurality of electrolyte clusters by aggregation of the second electrolyte; and (c) mixing the plurality of catalyst particles, whose surface is coated with the first electrolyte, with the plurality of electrolyte clusters, so as to manufacture an electrode, in which the plurality of catalyst particles are connected with one another via the plurality of electrolyte clusters.

The first method manufactures the electrode for the fuel cell, in which the catalyst particles whose surface is coated with the first electrolyte are mixed with the electrolyte clusters formed by aggregation of the second electrolyte. In the electrode for the fuel cell thus manufactured, the ions required for the electrochemical reaction and the ions produced through the electrochemical reaction can move through the first electrolyte that coats the catalyst particles. The plurality of electrolyte clusters ensure the ion transmission pathway between the catalyst in the electrode and an electrolyte film included in the fuel cell. This method separately carries out the process of coating the surface of the catalyst particles with the first electrolyte and the process of forming the electrolyte clusters, so as to enable the ratio of the catalyst particles to the electrolyte clusters to be regulated easily.

In accordance with one preferable embodiment of the first method according to the present invention, the step (b) includes the step of: mixing the second electrolytic solution with a solvent that has a sufficiently lower polarity than that of the second electrolytic solution, so as to lower the polarity of the second electrolytic solution and thereby make the second electrolyte deposit. This preferable structure enables the second electrolyte to deposit by the simple procedure of mixing the second electrolytic solution with a solvent of sufficiently low polarity.

The present invention also provides a second method of manufacturing an electrode for a fuel cell. The second method includes the steps of: (d) mixing a plurality of catalyst particles, which include a catalyst at least on surface thereof, with an electrolytic solution, which is prepared by dissolving an electrolyte in a first solvent, so as to yield a paste; and (e) drying the paste to complete an electrode, in which the plurality of catalyst particles are connected with one another via a plurality of electrolyte clusters, each electrolyte cluster being formed by aggregation of the electrolyte. The step (e) includes the steps of (e-1) coating the surface of the catalyst particles with the electrolyte; and (e-2) modifying the state of dissolution of the electrolyte in the paste to make the electrolyte deposit in the paste, thereby forming the plurality of electrolyte clusters, in which the electrolyte aggregates.

The second method manufactures the electrode for the fuel cell, in which the catalyst particles whose surface is coated with the electrolyte are mixed with the electrolyte clusters formed by aggregation of the electrolyte. In the electrode for the fuel cell thus manufactured, the ions required for the electrochemical reaction and the ions produced through the electrochemical reaction can move through the electrolyte that coats the catalyst particles. The plurality of electrolyte clusters ensure the ion transmission pathway between the catalyst in the electrode and an electrolyte film included in the fuel cell. The coating of the surface of the catalyst particles with the electrolyte and the formation of the electrolyte clusters are carried out simultaneously in the course of drying the paste. The second method thus simplifies the manufacturing process, compared with the first method discussed above.

In accordance with one preferable embodiment of the second method according to the present invention, the step (d) includes the step of: further adding a second solvent, which has sufficiently lower volatility and polarity than those of the first solvent included in the electrolytic solution, in the course of preparing the paste. The step (e-2) includes the step of: causing the first solvent included in the electrolytic solution to vaporize first, so as to lower the overall polarity of the mixed solvent in the paste and thereby make the electrolyte deposit in the paste. This preferable structure enables the polarity of the paste to gradually decrease in the course of drying the paste, and causes the electrolyte to deposit simply by mixing adding a solvent of sufficiently low volatility and polarity to the paste.

The present invention further provides a third method of manufacturing an electrode for a fuel cell. The third method includes the steps of: (f) in an electrolytic solution, which is prepared by dissolving an electrolyte in a solvent, modifying the state of dissolution of the electrolyte, so as to make the electrolyte deposit and form a plurality of electrolyte clusters by aggregation of the electrolyte; (g) mixing a plurality of catalyst particles, which include a catalyst at least on surface thereof, with the electrolytic solution containing the plurality of electrolyte clusters, so as to yield a paste; and (h) drying the paste and causing the surface of the plurality of catalyst particles to be coated with the electrolyte, thereby manufacturing an electrode, in which the plurality of catalyst particles are connected with one another via the plurality of electrolyte clusters.

The third method manufactures the electrode for the fuel cell, in which the catalyst particles whose surface is coated with the electrolyte are mixed with the electrolyte clusters formed by aggregation of the electrolyte. In the electrode for the fuel cell thus manufactured, the ions required for the electrochemical reaction and the ions produced through the electrochemical reaction can move through the electrolyte that coats the catalyst particles. The plurality of electrolyte clusters ensure the ion transmission pathway between the catalyst in the electrode and an electrolyte film included in the fuel cell. The coating of the surface of the catalyst particles with the electrolyte is implemented in the course of drying the paste. The third method thus simplifies the manufacturing process, compared with the first method discussed above.

In accordance with one preferable embodiment of the third method according to the present invention, the step (f) includes the step of: mixing the electrolytic solution with a solvent, which has a sufficiently lower polarity than that of the electrolytic solution, so as to lower the polarity of the electrolytic solution and thereby make the electrolyte deposit. This preferable structure enables the electrolyte to deposit and forms the electrolyte clusters by the simple process of mixing the electrolytic solution with a solvent of sufficiently low polarity.

In any of the electrodes for a fuel cell according to the present invention and any of the corresponding methods of manufacturing the electrode for a fuel cell, it is preferable that at least either one of the electrolyte for coating the catalyst particles and the electrolyte included in the catalyst clusters is a perfluorocarbon sulfonic acid resin. Use of the perfluorocarbon sulfonic acid resin effectively lowers the polarity, thereby enabling the electrolyte to deposit readily and facilitating formation of the electrolyte clusters.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
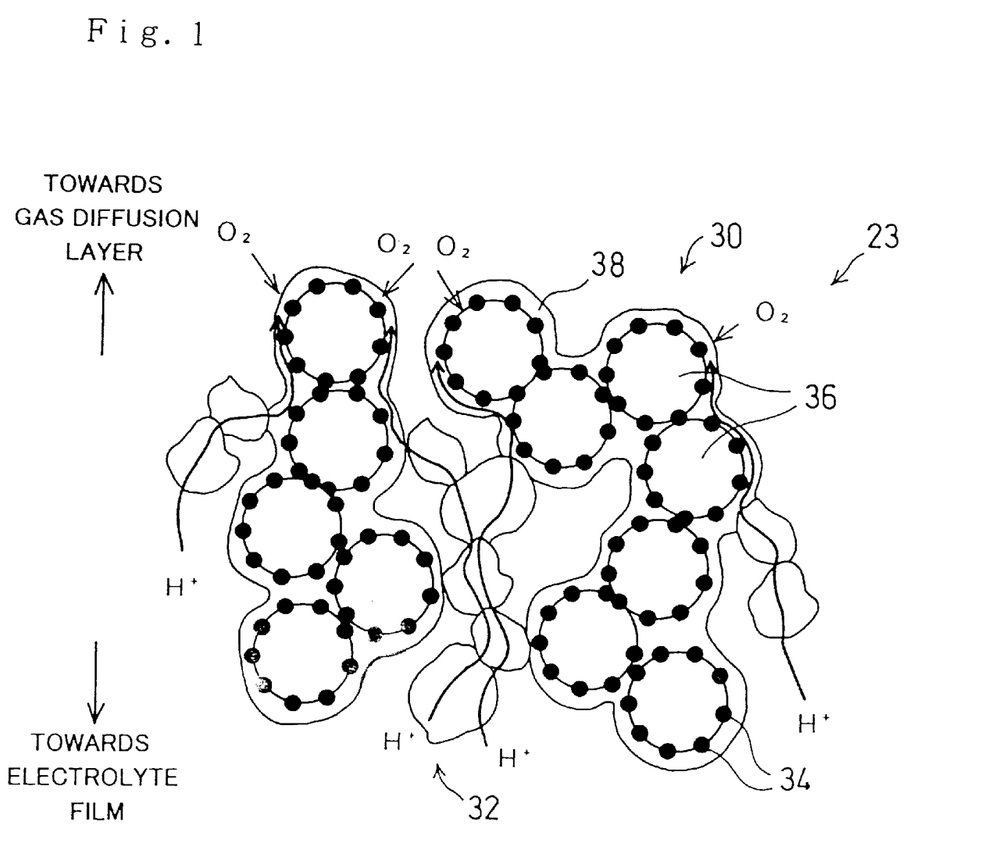
FIG. 1 schematically illustrates the structure of a catalyst electrode 23 embodying the present invention.
Figure 2:
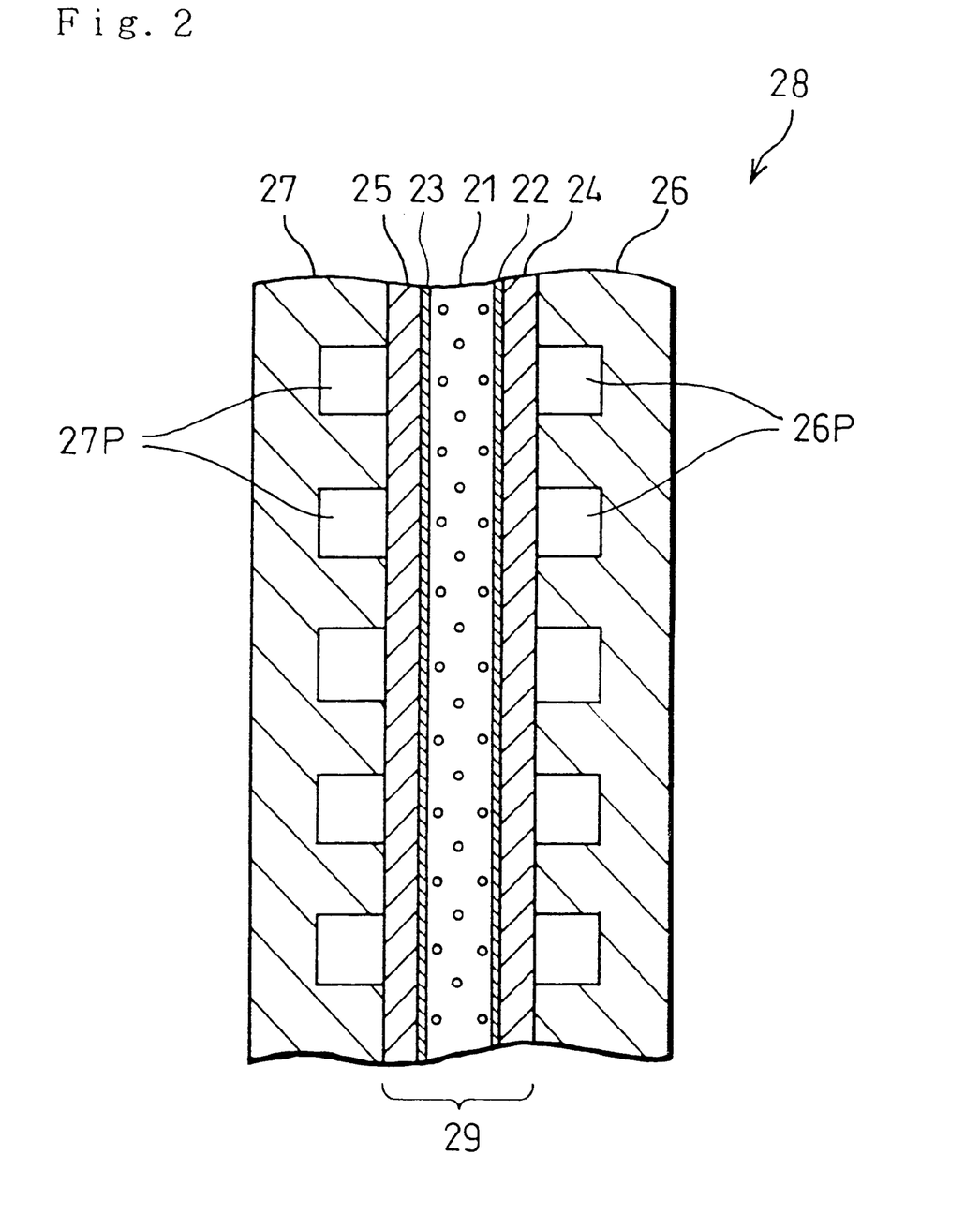
FIG. 2 is a cross sectional view illustrating the structure of a unit cell 28 included in a stack of fuel cells 20 of the embodiment.

FIG. 1 schematically illustrates the structure of a catalyst electrode 23 embodying the present invention. FIG. 2 is a cross sectional view illustrating the structure of a unit cell 28 included in a stack of fuel cells (polymer electrolyte fuel cells) 20, each including the catalyst electrode 23.

As shown in FIG. 2, the unit cell 28 includes an electrolyte film 21, a pair of catalyst electrodes 22 and 23 that are arranged across the electrolyte film 21 to constitute a sandwich-like structure, a pair of gas diffusion electrodes 24 and 25 that are further arranged across the sandwich-like structure, and separators 26 and 27 that are disposed outside the gas diffusion electrodes 24 and 25. The separators 26 and 27 are connected respectively with the gas diffusion electrodes 24 and 25 to form flow paths of gaseous fuel and oxidizing gas. Flow paths of gaseous fuel 26P are formed between the gas diffusion electrode 24 on the anode side and the separator 26. Flow paths of oxidizing gas 27P are formed between the gas diffusion electrode 25 on the cathode side and the separator 27.

The electrolyte film 21 is a proton-conducting ion exchange film composed of a solid polymer material, for example, a fluororesin, and shows the good electrical conduction in the wet state. A Nafion film (Nafion 112 ex. Du Pont) of 50 $\mu$m in thickness is used in this embodiment.

Each of the catalyst electrodes 22 and 23 is produced as a layer including carbon particles with a catalyst carried on the surface thereof and an electrolyte. FIG. 1 shows the catalyst electrode 23 functioning as the cathode. The catalyst electrode 22 functioning as the anode has a similar structure. In the catalyst electrodes 22 and 23, a plurality of catalyst clusters 30 and a plurality of electrolyte clusters 32 are mixed in intimate contact with each other. The catalyst cluster 30 is formed by aggregation of carbon particles 36 with a catalyst 34 carried on the surface thereof, and the surface of the catalyst cluster 30 is coated with an electrolyte layer 38. The electrolyte cluster 32 is formed by aggregation of an electrolyte. In the catalyst electrode 23 that functions as the cathode and is shown in FIG. 1, a supply of protons that is fed from the anode and passes through the electrolyte film 21 is transmitted towards the gas diffusion electrode 25 via the electrolyte layer 38 that coats the surface of the catalyst clusters 30. A supply of electrons (not shown) is fed together with oxygen molecules from the gas diffusion electrode 25 to the catalyst 34 included in the catalyst electrode 23. The reaction of Equation (2) discussed above accordingly proceeds on the catalyst 34. The catalyst 34 that is carried on the surface of the carbon particles 36 may be platinum or an alloy of platinum and another metal. The platinum catalyst is used in this embodiment. A catalyst paste, in which the catalyst clusters 30 and the electrolyte clusters 32 are mixed, should be manufactured for production of these catalyst electrodes 22 and 23. The method of manufacturing this catalyst paste will be discussed later.

Each of the gas diffusion electrodes 24 and 25 is made of water-repellent carbon paper having the surface coated with polytetrafluoroethylene (PTFE, trade name Teflon). The unit cell 28 is assembled in the manner discussed below. First, the gas diffusion electrodes 24 and 25 are arranged across the electrolyte film 21 to form an electrode assembly 29. The catalyst paste described above (that is, the catalyst paste in which the catalyst clusters 30 and the electrolyte clusters 32 are mixed) is applied on the carbon paper coated with PTFE and sufficiently dried. A pair of such paste-coated sheets of carbon paper are disposed across the electrolyte film 21. The paste-coated carbon paper is arranged to cause its catalyst paste-applied side to face the electrolyte film 21. The electrode assembly 29 is obtained by hot pressing under the surface pressure of 50 kg/cm$^2$ at the temperature of 130° C.

Each of the separators 26 and 27 is made of a gas-impermeable conductive material, for example, gas-impermeable dense carbon prepared by compacting carbon, or a metal material. A plurality of ribs having a predetermined shape are formed on the surface of the separators 26 and 27.

As described previously, the separator 26 is connected with the surface of the gas diffusion electrode 24 to form the plurality of flow paths of gaseous fuel 26P, whereas the separator 27 is connected with the surface of the gas diffusion electrode 25 to form the plurality of flow paths of oxidizing gas 27P. The ribs formed on the surface of each separator 26, 27 may have any shape that forms a plurality of gas flow paths and allows a supply of gaseous fuel or oxidizing gas to the corresponding gas diffusion electrode 24, 25. Although the separators 26 and 27 are shown as different elements in FIG. 2, each separator actually used in the stack of fuel cells 20 has a plurality of ribs formed on both faces thereof and is shared by the adjoining unit cells 28.

The stack of fuel cells 20 is assembled by laying plural sets (100 sets in this embodiment) of the unit cells 28 having the above structure one upon another. In the actual assembly of the stack of fuel cells 20, the separators are interposed between the electrode assemblies 29 to form a stack structure, and electricity-collecting plates composed of dense carbon or copper are arranged on both ends of the stack structure. In the stack of fuel cells 20 thus completed, a supply of gaseous fuel containing hydrogen and a supply of oxidizing gas containing oxygen are fed respectively through the flow paths of gaseous fuel 26P and the flow paths of oxidizing gas 27P. This arrangement enables the supply of gaseous fuel and the supply of oxidizing gas to be fed respectively to the catalyst electrodes 22 and 23. The electrochemical reactions of Equations (1) through (3) given above proceed, so as to convert the chemical energy of the fuel to electrical energy.

Figure 3:
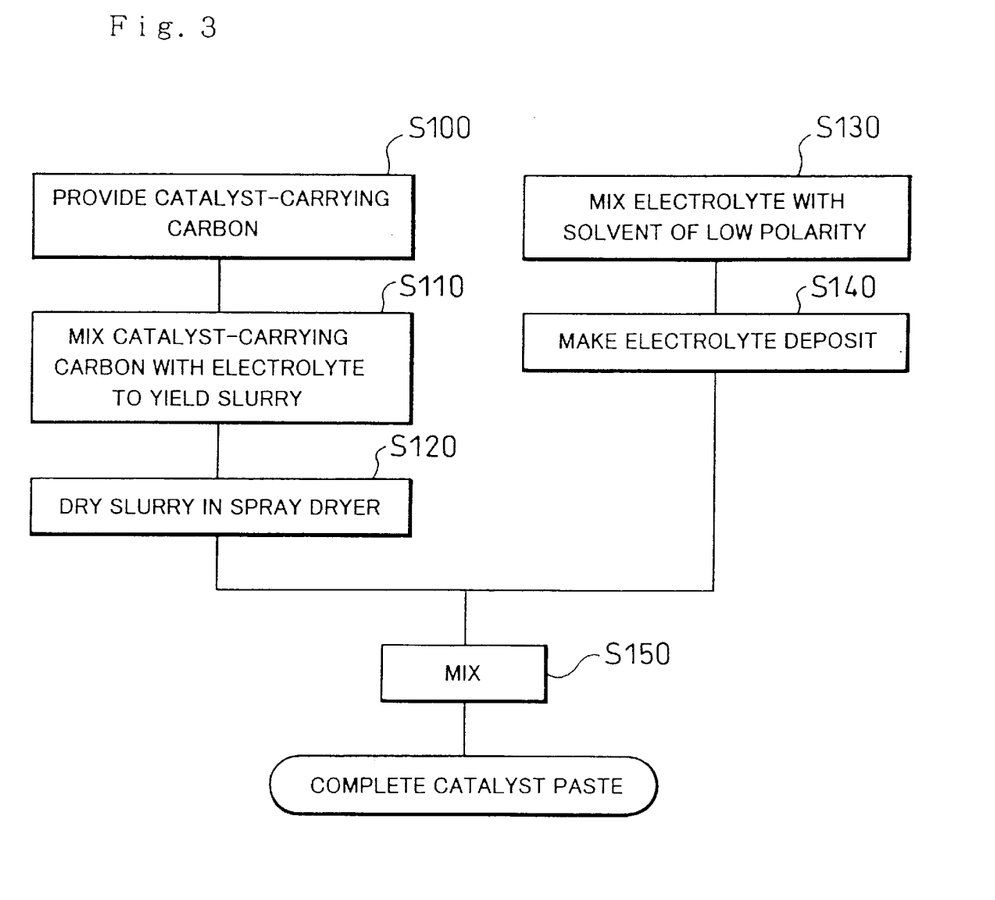
FIG. 3 is a flowchart showing a process of manufacturing a catalyst paste in the embodiment.

The following describes the method of manufacturing the catalyst paste to form the catalyst electrodes 22 and 23. FIG. 3 is a flowchart showing a process of manufacturing the catalyst paste in the embodiment. The process provides carbon granules (vulcanXC72) with platinum carried thereon at the weight ratio of 20% at step S100. The carbon granules have the mean particle diameter of about 30 nm. In general, a plurality of the carbon granules aggregate to form fine particles having the particle diameter of several hundred nm. The catalyst-carrying carbon fine particles are mixed with and dispersed in a solution of perfluorocarbon sulfonic acid resin (Nafion solution, ex Aldrich Chemical Inc.) having the 5% solid content and isopropyl alcohol at the weight ratio of 1 to 5 to 15 to give a slurry at step S110. The slurry is fed to and dried with a spray dryer device, in order to give catalyst-carrying carbon particles whose surface is coated with the electrolyte at step S120. The size of the catalyst-carrying carbon particles obtained at step S120 is greater than the size of the catalyst-carrying carbon fine particles provided at step S100. The size of the catalyst-carrying carbon particles, that is, the amount of aggregation of the catalyst-carrying carbon granules, may be controlled by regulating the supply of slurry fed to the spray dryer device and the temperature in the spray dryer device. The surface of each aggregated catalyst-carrying carbon particle is coated with the electrolyte in this manner. This gives the catalyst clusters 30.

A solution containing the electrolyte, perfluorocarbon sulfonic acid resin (Nafion solution, ex Aldrich Chemical Inc.) having the 5% solid content is mixed with n-butyl ether at the weight ratio of 1 to 1 at step S130. Adding n-butyl ether lowers the polarity of the electrolytic solution and thereby causes the electrolyte to deposit in the electrolytic solution at step t140. This makes the n-butyl ether mixed solution cloudy. The deposit is caggregation of plural molecules of perfluorocarbon sulfonic acid resin and forms the electrolyte clusters 32. The process then mixes the cloudy mixed solution obtained at step s140 with the electrolyte-coating carbon particles obtained at step S120 at the weight ratio of 20 to 1 at step S150. This completes a catalyst paste.

Figure 4:
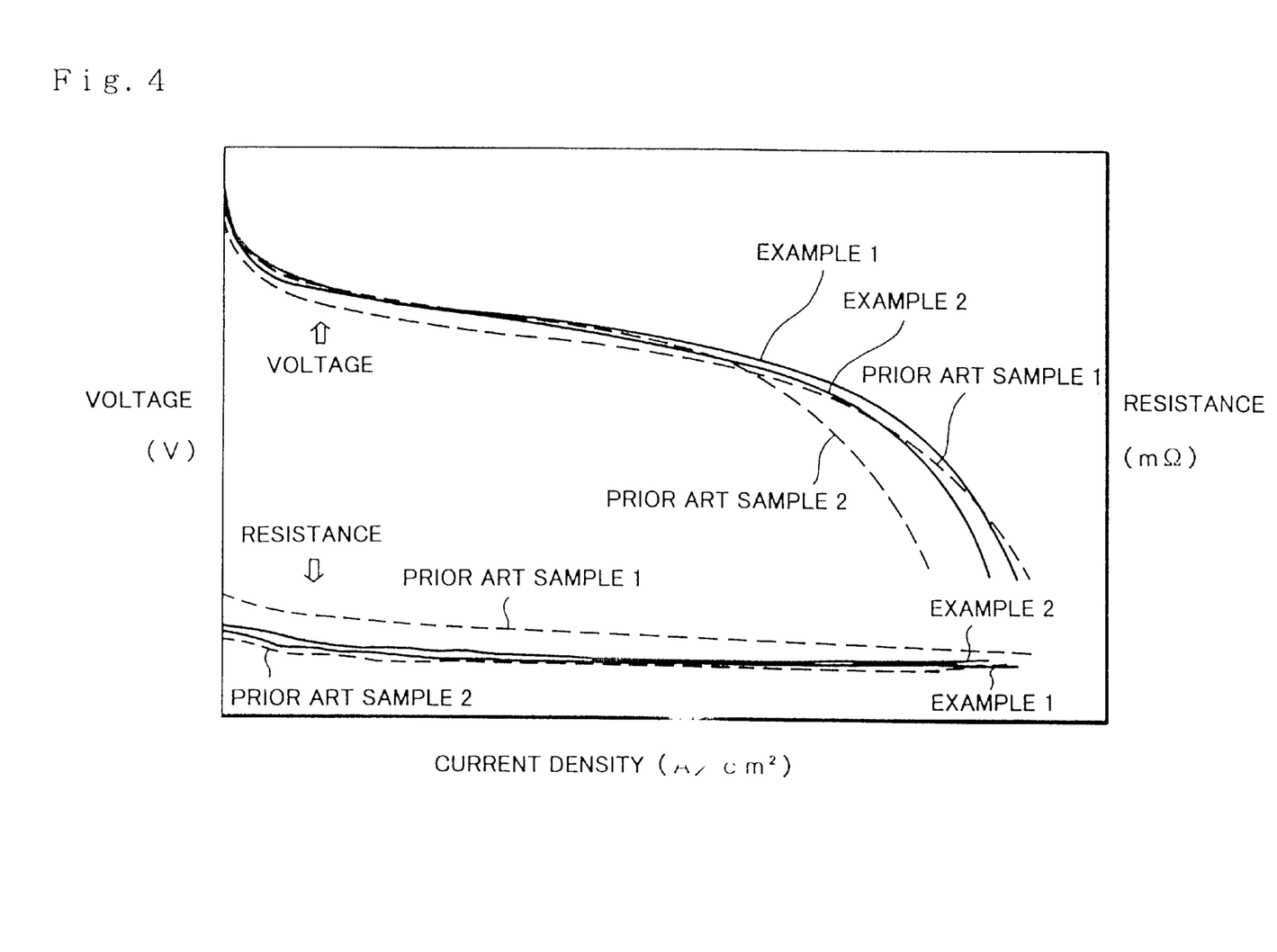
FIG. 4 is a graph showing the voltage-current characteristic curves measured for the unit fuel cells manufactured according to the procedure of the embodiments of the present invention and for the unit fuel cells manufactured according to the prior art technique.

The graph of FIG. 4 shows the voltage-current characteristic curves measured for the electrode assemblies produced with the catalyst paste of the present invention. In the graph of FIG. 4, the voltage-current characteristic curve with respect to the electrode assembly manufactured according to the procedure of the above embodiment is expressed as the curve of Example 1. The graph of FIG. 4 also shows the voltage-current characteristic curves measured for the electrode assemblies produced with the catalyst paste prepared according to the prior art technique. The characteristic curves with respect to the electrode assemblies manufactured according to the prior art technique are expressed as the curves of Prior Art Samples 1 and 2. This experiment interposed each electrode assembly between a pair of metal holders to assemble a unit cell, fed the supplies of gaseous fuel and oxidizing gas to the corresponding sides of the electrode assembly, and measured the voltage-current characteristic with respect to the electrode assembly. The following describes the procedure of manufacturing the prior art samples used in this experiment.

The prior art samples were manufactured by carrying out only the processes of steps S100 and S110 in the manufacturing procedure of the embodiment shown in FIG. 3. In the same manner as the above embodiment, the prior art technique mixed the catalyst-carrying carbon granules with the electrolytic solution and isopropyl alcohol to give a slurry. This slurry was used as the catalyst paste. The catalyst paste was applied on the waterrepellent carbon paper coated with PTFE, and was sufficiently dried. A pair of paste-coated sheets of carbon paper were disposed across an electrolyte film and hot pressed to give an electrode assembly. In the experiment of FIG. 4, the result of the unit fuel cell including the mixture of the catalyst-carrying carbon granules, the electrolytic solution, and the isopropyl alcohol at the weight ratio of 1 to 5 to 15 is expressed as Prior Art Sample 1. The result of the unit cell including the mixture at the weight ratio of 1 to 15 to 5 is expressed as Prior Art Sample 2. Namely the quantity of the electrolyte for coating the catalyst-carrying carbon in Prior Art Sample 1 was substantially equivalent to that of Example 1, whereas the quantity of electrolyte in Prior Art Sample 2 was greater than that of Example 1. The graph of FIG. 4 also shows the resistance (internal resistance of the unit fuel cell)-current density characteristic curves as well as the voltage-current characteristic curves, with respect to the electrode assemblies of the embodiments and the electrode assemblies of the prior art samples.

As clearly shown in FIG. 4, the voltage-current characteristic of the electrode assembly of Example 1 was better than that of the electrode assembly of Prior Art Sample 2 and substantially equivalent to that of the electrode assembly of Prior Art Sample 1. In the electrode assembly of Prior Art Sample 2, some increase in output current caused an abrupt decrease in voltage. In the electrode assemblies of Example 1 and Prior Art Sample 1, on the other hand, the equivalent increase in output current did not cause an abrupt decrease in voltage but ensured the sufficient voltage. The sufficient voltage kept under the condition of the large output current means that the catalyst electrode disposed between the electrolyte film and the gas diffusion electrode ensures the sufficient gas diffusion ability. Even under the condition of the large output current, a sufficient amount of the reactant is fed to the catalyst and enables the electrochemical reaction to proceed at the sufficient level.

The resistance-current density characteristic of the electrode assembly of Example 1 was better than that of the electrode assembly of Prior Art Sample 1 and substantially equivalent to that of the electrode assembly of Prior Art Sample 2. Irrespective of the value of the output current from the electrode assembly, the electrode assemblies of Example 1 and Prior Art Sample 2 had lower resistances than that of the electrode assembly of Prior Art Sample 1. The lower resistance implies that the catalyst electrode disposed between the electrolyte film and the gas diffusion electrode ensures the sufficient ion-conducting ability.

In the prior art technique, the increase in quantity of the electrolyte worsens the gas diffusion ability, whereas the decrease in quantity of the electrolyte worsens the ion-conducting ability. The catalyst electrodes 22 and 23 included in the stack of fuel cells 20 of the embodiment, on the other hand, ensure the sufficient gas diffusion ability and ion-conducting ability and thereby improves the performance of the fuel cells 20. This effect is attributable to the phenomenon that catalyst clusters 30, which are formed by aggregation of the catalyst-carrying carbon coated with the electrolyte, and the electrolyte clusters 32, which are formed by aggregation of the electrolyte deposit, are mutually connected and entwined. The quantity of the electrolyte for coating the catalyst-carrying carbon in the catalyst clusters 30 is restricted to the level that does not deteriorate the gas diffusion ability to the catalyst. Even in the case of an increase in output current from the fuel cell, this arrangement enables a sufficient supply of the gas (reactant) to be continuously fed to the catalyst and ensures the sufficient progress of the electrochemical reaction, thereby preventing an abrupt voltage drop. The amount of the electrolyte for coating the catalyst-carrying carbon, which is restricted to the level that does not deteriorate the gas diffusion ability, ensures the microscopic ion transmission path in the vicinity of the catalyst and enables the ions required for the electrochemical reaction on the catalyst and the ions produced through the electrochemical reaction to move smoothly in the vicinity of the catalyst. In the catalyst electrode, the catalyst clusters 30 are connected with one another via the electrolyte clusters 32. This arrangement ensures the macroscopic ion transmission path between the catalyst electrode and the electrolyte film. This arrangement realizes the sufficient ion-conducting ability without increasing the thickness of the electrolyte layer on the surface of catalyst-carrying carbon and thereby keeps the internal resistance of the fuel cells 20 at a sufficiently low level.

The arrangement of the above embodiment lowers the polarity of the electrolytic solution and makes the electrolyte deposit in the electrolytic solution, in order to form the catalyst clusters 30. Namely the catalyst clusters 30 can be formed readily by the simple process of mixing the solvent of lower polarity with the electrolytic solution. Regulating the amount of the solvent added to lower the polarity can control the state of deposit of the electrolyte, that is, the state of formation of the catalyst clusters 30.

In the procedure of the above embodiment, the catalyst clusters 30 and the electrolyte clusters 32 are prepared separately and mixed sufficiently to give the catalyst paste, which is used for manufacturing the catalyst electrode. This arrangement enables the mixing ratio of the catalyst clusters 30 to the electrolyte clusters 32 to be regulated readily and gives the sufficiently homogeneous catalyst electrode, in which the microscopic ion transmission path well balances the macroscopic ion transmission path. In the catalyst electrode of the embodiment, the catalyst clusters 30 and the electrolyte clusters 32 are mutually connected and entwined. This arrangement enables the catalyst electrode to have the sufficient strength, without increasing the thickness of the electrolyte layer for coating the carbon-carrying carbon.

The procedure of the above embodiment mixes the catalyst clusters 30 obtained at step S120 in the flowchart of FIG. 3 directly with the electrolyte clusters 32 obtained at step S140. Prior to this mixing step, the catalyst clusters 30 may be subjected to heat treatment. In this case, the catalyst clusters 30 obtained at step S120 are subjected to the heat treatment at 130 to 150° C., so as to insolubilize the electrolyte layer that coats the surface of the catalyst-carrying carbon. Insolubilization of the electrolyte protects the electrolyte layer for coating the catalyst-carrying carbon from being damaged by the subsequent processing.

The procedure of the embodiment discussed above prepares the catalyst clusters 30 and the electrolyte clusters 32 separately and mixes with each other to give the catalyst paste, with which the catalyst electrode is produced. Another possible procedure does not have any special steps for forming the catalyst clusters 30 and the electrolyte clusters 32 separately, but causes the catalyst clusters 30 and the electrolyte clusters 32 to be formed simultaneously after the production of the catalyst paste. This arrangement is described below as a second embodiment according to the present invention. The second embodiment enables the coating of the catalyst-carrying carbon with the electrolyte and the deposit of the electrolyte to be carried out simultaneously in the course of drying the catalyst paste containing the electrolyte, so as to attain the same effects as those of the above embodiment.

Figure 5:
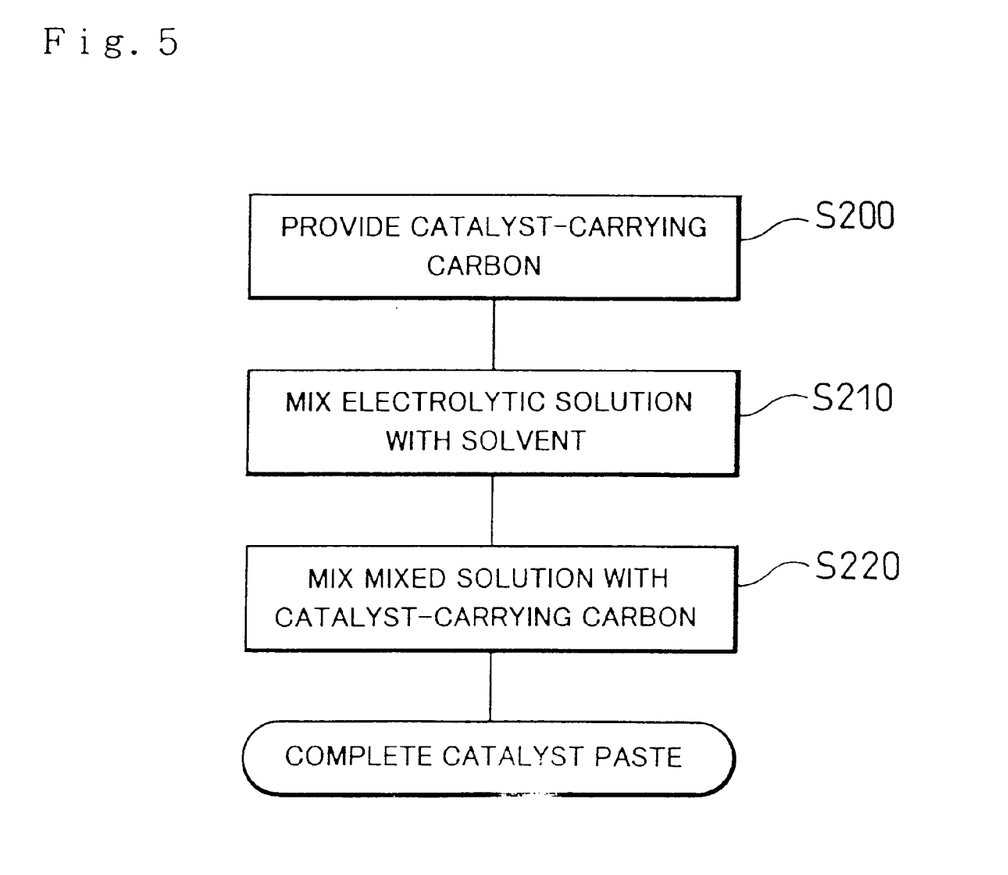
FIG. 5 is a flowchart showing another process of manufacturing a catalyst paste in a second embodiment according to the present invention.

FIG. 5 is a flowchart showing another process of manufacturing the catalyst paste in the second embodiment. Like the embodiment discussed above, the process first provides carbon granules (vulcanXC72) with platinum carried thereon at the weight ratio of 20% at step S200. A solution of perfluorocarbon sulfonic acid resin (Nafion solution, ex Aldrich Chemical Inc.) having the solid content of 5% is mixed with n-butyl ether at the weight ratio of 5 to 2 at step S210. The process subsequently mixes this mixed solution with the catalyst-carrying carbon granules provided at step S200 at the weight ratio of 14 to 1 at step S220. This completes a catalyst paste.

An electrode assembly is manufactured with the catalyst paste of the second embodiment prepared in the above manner. In the same manner as the embodiment discussed above, the manufacturing method prepares a pair of paste-coated sheets of carbon paper by applying and drying the catalyst paste on the carbon paper coated with PTFE and disposes the pair of paste-coated sheets of carbon paper across an electrolyte film. The carbon paper is arranged to cause its paste-coated side to face the electrolyte film and hot pressed under the surface pressure of 50 kg/cm$^2$ at the temperature of 130° C. to give an electrode assembly. The similar structure to that of the catalyst clusters 30 and the electrolyte clusters 32 is formed in the catalyst paste in the course of drying the catalyst paste applied on the carbon paper. In the process of drying the catalyst paste, the highly volatile, polar solvent (isopropyl alcohol) contained in the electrolytic solution is vaporized prior to n-butyl ether. This gradually lowers the polarity of the remaining solvent. The electrolyte component thus partly deposits in the catalyst paste in the course of drying the catalyst paste, so that the similar structure to that of the electrolyte clusters 32 is formed in the catalyst paste. When the drying process of the catalyst paste is completed, the surface of the catalyst-carrying carbon is coated with the electrolyte and has the similar structure to that of the catalyst clusters 30 of the above embodiment. The similar structure to that of the electrolyte clusters 32 formed by the deposit of the electrolyte in the drying process is connected and entwined with the structure similar to that of the catalyst clusters 30. This results in forming the structures similar to the catalyst electrodes 22 and 23 of the above embodiment.

The electrode assembly prepared with the catalyst paste of the second embodiment was interposed between a pair of metal holders to give a unit fuel cell. The voltage-current characteristic curve and the resistance-current density characteristic curve of this unit fuel cell is expressed as Example 2 in the graph of FIG. 4. As clearly shown in the graph of FIG. 4, the unit fuel cell of Example 2 had the voltage-current characteristic and the resistance-current density characteristic substantially equivalent to those of the unit cell of Example 1. Even in the case of an increase in output current, the arrangement of Example 2 did not cause an abrupt voltage drop. This ensures the sufficient gas diffusion ability of the catalyst electrolyte included in this unit fuel cell. The unit fuel cell of Example 2 had the sufficiently low resistance, irrespective of the current density. This ensures the sufficient ion-conducting ability of the catalyst electrode.

The arrangement of the second embodiment coats the catalyst-carrying carbon with the electrolyte, so as to form the similar structure to that of the catalyst clusters 30, and causes the electrolyte to deposit in the catalyst paste in the course of drying the catalyst paste, so as to form the similar structure to that of the electrolyte clusters 32. These structures respectively similar to the catalyst clusters 30 and the electrolyte clusters 32 are connected and entwined with each other, so as to attain the same effects as those of the embodiment discussed above. The procedure of the second embodiment prepares the catalyst paste not by mixing the catalyst clusters with the electrolyte clusters that are prepared separately but simply by mixing the raw materials. The catalyst clusters and the electrolyte clusters are formed in the drying process of the catalyst paste. This effectively simplifies the manufacturing process of the catalyst paste.

Figure 6:
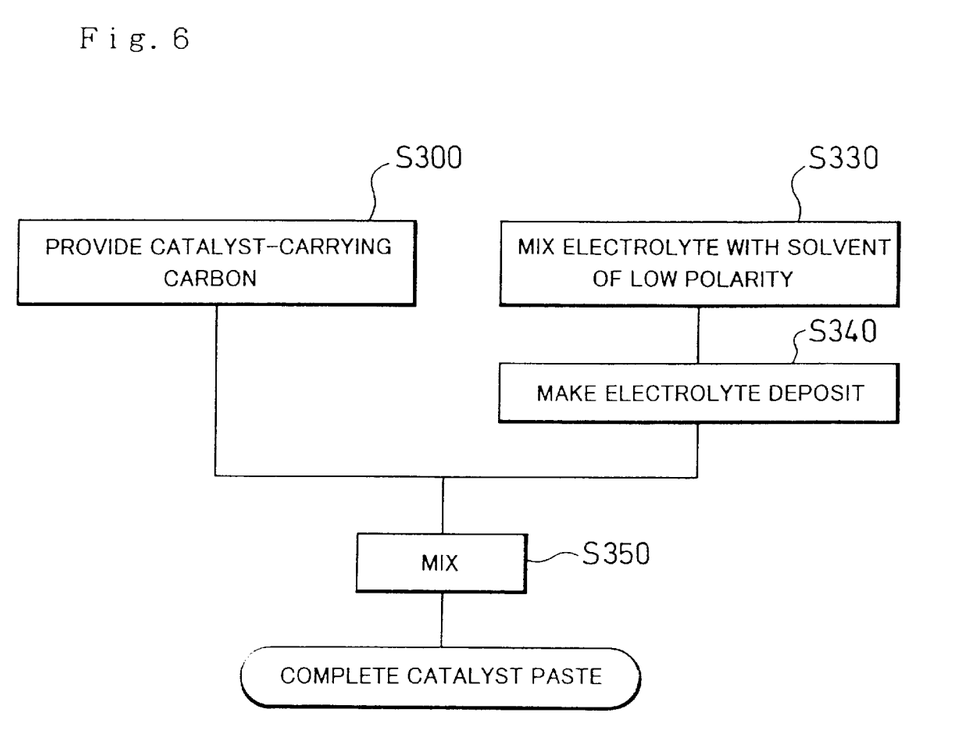
FIG. 6 is a flowchart showing still another process of manufacturing a catalyst paste in a third embodiment according to the present invention.

The second embodiment forms the structures similar to those of the catalyst clusters 30 and the electrolyte clusters 32 in the course of drying the catalyst paste containing the catalyst-carrying carbon and the electrolyte. Another possible procedure forms the structure similar to the electrolyte clusters 32 separately from the production of the catalyst paste and coats the catalyst-carrying carbon with an electrolyte in the course of drying the catalyst paste. This arrangement is discussed below as a third embodiment according to the present invention. FIG. 6 is a flowchart showing still another process of manufacturing the catalyst paste in the third embodiment. The procedure of manufacturing the catalyst paste shown in the flowchart of FIG. 6 is similar to the procedure of manufacturing the catalyst paste shown in the flowchart of FIG. 3, except that the processes corresponding to step S110 and S120 are omitted from the procedure of the third embodiment. The procedure of the third embodiment mixes the electrolytic solution, that is, the solution of perfluorocarbon sulfonic acid resin (Nafion solution, ex Aldrich Chemical Inc.), with n-butyl ether at step S330 and causes the electrolyte to deposit at step S340. The procedure then mixes the catalyst-carrying carbon, which has not yet been coated with the electrolyte, with the cloudy mixed solution at step S350. This completes a catalyst paste.

In the same manner as the second embodiment, the catalyst paste of the third embodiment thus prepared is applied and dried on the carbon paper coated with PTFE. In the course of drying the catalyst paste, the catalyst-carrying carbon is coated with the electrolyte to form the structure similar to the catalyst clusters 30 of the above embodiment. In the depositing process of step S340, the structure similar to the electrolyte clusters 32 is formed in the catalyst paste. Like the above embodiment, in the dried catalyst paste, the structures similar to those of the catalyst clusters 30 and the electrolyte clusters 32 are connected and entwined with each other. An electrode assembly is obtained by disposing a pair of paste-coated sheets of carbon paper across an electrolyte film and hot pressing the paste-coated sheets of carbon paper.

In a catalyst electrode manufactured with the catalyst paste of the third embodiment, the catalyst-carrying carbon is coated with the electrolyte to form the structure similar to that of the catalyst clusters 30. The electrolyte depositing in the process of drying the catalyst paste forms the structure similar to that of the electrolyte clusters 32. These structures that are respectively similar to those of the catalyst clusters 30 and the electrolyte clusters 32 are connected and entwined with each other, so as to attain the similar effects to those of the above embodiments. The arrangement of the third embodiment does not require the separate process for forming the catalyst clusters coated with the electrolyte, but enables the catalyst-carrying carbon to be coated with the electrolyte in the course of drying the catalyst paste. This effectively simplifies the manufacturing process of the catalyst electrode, compared with the process of manufacturing the catalyst electrode shown in the flowchart of FIG. 3.

In the course of drying the catalyst paste according to the method of the third embodiment, as the solvent in the catalyst paste is vaporized to increase the concentration of the electrolyte, the electrolyte continues depositing and the degree of aggregation of the electrolyte increases in the structure similar to that of the electrolyte clusters 32 formed in the catalyst paste. In the process of manufacturing the catalyst electrode according to the method of the third embodiment, the deposit of the electrolyte may be restricted to the level that is less than a desired quantity, by taking into account this increase in degree of aggregation of the electrolyte in the drying process. Another application adds a solvent having a lower volatility and a higher polarity than those of the solvent in the catalyst paste to the catalyst paste, prior to the drying process. This prevents the deposit of the catalyst from further proceeding in the drying process.

In the embodiments discussed above, n-butyl ether is used as the solvent to make the electrolyte deposit and form the catalyst clusters 30. Another ether solvent or any other solvent may be used instead, as long as the solvent can be mixed homogeneously with the alcohol solvent included in the electrolytic solution and sufficiently lower the polarity of the electrolytic solution in order to enable the electrolyte to deposit. The amount of the solvent added to the electrolytic solution to lower the polarity may be regulated according to the polarity of the solvent. This arrangement lowers the polarity of the solvent, in which the electrolyte fine particles are dispersed, to a desired level and thus enables the electrolyte to sufficiently deposit.

Any electrolyte other than the perfluorocarbon sulfonic acid resin (Nafion) used in the above embodiments, for example, another conductive resin, may be used for the electrolyte that coats the catalyst-carrying carbon and for the electrolyte that deposits to form the electrolyte clusters. Available examples of the conductive resin include those having the functional groups, such as sulfonic groups, carboxylic groups, and phosphoric groups, and attaining the ion-conducting ability. Although the same electrolyte is used for the electrolyte that coats the catalyst-carrying carbon and the electrolyte that deposits to form the electrolyte clusters in the above embodiments, different electrolytes may be used instead. Even in the case where different electrolytes are applied, the arrangement ensures the ion transmission path in the vicinity of the surface of the catalyst and the ion transmission path in the whole catalyst electrode, thereby attaining the same effects as those of the above embodiments.

Any process other than the process of lowering the polarity as discussed in the above embodiments may be applied to make the electrolyte deposit and form the electrolyte clusters. One available process lowers the temperature of the solution containing the electrolyte or of the catalyst paste. The method suitable for the properties of the electrolyte is selected to make the electrolyte deposit and form the electrolyte clusters, which are separate from the electrolyte for coating the catalyst-carrying carbon.

In the above embodiments, the catalyst for accelerating the electrochemical reaction is carried on the carbon particles, and the catalyst electrode is produced with the catalyst-carrying carbon particles. This arrangement ensures the sufficient catalytic surface area as well as the sufficient electron-conducting ability in the catalyst electrode. A plurality of catalyst-carrying carbon particles aggregate to form a catalyst cluster. This structure enables electrons to freely move through the aggregated catalyst clusters and ensures the sufficient electron-conducting ability in the whole catalyst electrode. Metal fine particles composed of a catalytic metal may be used instead of the catalyst-carrying carbon particles. In this case, the surface of the metal fine particles is coated with an electrolyte layer, and the catalytic metal coated with the electrolyte layer is mixed with the structure similar to that of the electrolyte clusters discussed in the above embodiments to form a catalyst electrode. This arrangement also attains the effects due to the existence of the electrolyte clusters in the catalyst electrode, that is, restricts the thickness of the electrolyte layer for coating the catalyst to ensure the gas diffusion ability and ensures the sufficient ion-conducting ability in the catalyst electrode.

The procedure of the above embodiments applies the catalyst paste on the surface of the carbon paper or gas diffusion electrode and disposes a pair of catalyst paste-coated sheets of carbon paper across an electrolyte film to constitute an electrode assembly. A different procedure may be applied to manufacture the electrode assembly. One available method applies or prints the catalyst paste on an electrolyte film, which constitutes the electrolyte layer of the fuel cell, instead of the carbon paper, and dries the applied or printed catalyst paste. In the case of the catalyst paste of the second embodiment, this available method carries out the coating of the catalyst-carrying carbon with the electrolyte and the formation of the electrolyte clusters on the electrolyte film. In the case of the catalyst paste of the third embodiment, this available method carries out the coating of the catalyst-carrying carbon with the electrolyte on the electrolyte film. An electrode assembly similar to that discussed in the above embodiments is obtained by interposing the electrolyte film having the either surfaces treated in the above manner between a pair of gas diffusion electrodes and hot pressing the laminate.

Another available method applies the catalyst paste on a PTFE film, which is not a constituent of the fuel cell, and dries the applied catalyst paste. In the case of the catalyst paste of the second embodiment, this method carries out the coating of the catalyst-carrying carbon with the electrolyte and the formation of the electrolyte clusters on the PTFE film. In the case of the catalyst paste of the third embodiment, this method carries out the coating of the catalyst-carrying carbon with the electrolyte on the PTFE film. An electrode assembly similar to that discussed in the above embodiments is obtained by disposing a pair of PTFE films with the catalyst electrode formed on the surface thereof across an electrolyte film in such a manner that the catalyst paste-coated surface of the PTFE film faces the electrolyte film, hot pressing the laminate, stripping the PTFE films off, interposing the electrolyte film between a pair of gas diffusion electrodes, and hot pressing the whole laminate.

The present invention is not restricted to the above embodiments or their modifications, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. An electrode for a fuel cell, comprising:
   a plurality of catalyst particles, each catalyst particle comprising a catalyst carried at least on surface thereof and the surface of each catalyst particle being coated with a first electrolyte; and
   a plurality of electrolyte clusters, each electrolyte cluster being formed by aggregation of a second electrolyte,
   wherein the plurality of catalyst particles are connected with one another via the plurality of electrolyte clusters.

2. An electrode for a fuel cell in accordance with claim 1, wherein at least one of the first electrolyte and the second electrolyte is a perfluorocarbon sulfonic acid resin.

3. An electrode for a fuel cell, comprising:
   a plurality of catalyst clusters, each catalyst cluster being formed by aggregation of a plurality of catalyst particles and surface of each catalyst cluster being coated with a first electrolyte, wherein each catalyst particle comprises a catalyst carried at least on surface thereof; and
   a plurality of electrolyte clusters, each electrolyte cluster being formed by aggregation of a second electrolyte,
   wherein the plurality of catalyst clusters are connected with one another via the plurality of electrolyte clusters.

4. An electrode for a fuel cell in accordance with claim 3, wherein at least one of the first electrolyte and the second electrolyte is a perfluorocarbon sulfonic acid resin.

5. A fuel cell comprising an electrode, wherein said electrode is produced by connecting a plurality of catalyst particles containing a catalyst with one another via a plurality of electrolyte clusters containing an electrolyte,
   each catalyst particle comprising the catalyst carried at least on surface thereof and the surface of each catalyst particle being coated with a first electrolyte,
   each electrolyte cluster being formed by aggregation of a second electrolyte.

6. A fuel cell comprising an electrode, wherein said electrode is produced by connecting a plurality of catalyst clusters containing a catalyst with one another via a plurality of electrolyte clusters containing an electrolyte,
   each catalyst cluster being formed by aggregation of a plurality of catalyst particles and surface of each catalyst cluster being coated with a first electrolyte, wherein each catalyst particle comprises the catalyst carried at least on surface thereof
   each electrolyte cluster being formed by aggregation of a second electrolyte.

7. A method of manufacturing an electrode for a fuel cell, said method comprising the steps of:
   (a) soaking a plurality of catalyst particles, which comprise a catalyst at least on surface thereof, in a first electrolytic solution, which is prepared by dissolving a first electrolyte in a solvent, and drying the soaked catalyst particles, so as to cause the surface of the catalyst particles to be coated with the first electrolyte;
   (b) in a second electrolytic solution, which is prepared by dissolving a second electrolyte in a solvent, modifying the state of dissolution of the second electrolyte, so as to make the second electrolyte deposit and form a plurality of electrolyte clusters by aggregation of the second electrolyte; and
   (c) mixing the plurality of catalyst particles, whose surface is coated with the first electrolyte, with the plurality of electrolyte clusters, so as to manufacture an electrode, in which the plurality of catalyst particles are connected with one another via the plurality of electrolyte clusters.

8. A method in accordance with claim 7, wherein said step (b) comprises the step of: mixing the second electrolytic solution with a solvent that has a sufficiently lower polarity than that of the second electrolytic solution; so as to lower the polarity of the second electrolytic solution and thereby make the second electrolyte deposit.

9. A method in accordance with claim 8, wherein at least one of the first electrolyte and the second electrolyte is a perfluorocarbon sulfonic acid resin.

10. A method in accordance with claim 7, wherein at least one of the first electrolyte and the second electrolyte is a perfluorocarbon sulfonic acid resin.

11. A method of manufacturing an electrode for a fuel cell, said method comprising the steps of:
   (d) mixing a plurality of catalyst particles, which comprise a catalyst at least on surface thereof, with an electrolytic solution, which is prepared by dissolving an electrolyte in a first solvent, so as to yield a paste; and (e) drying the paste to complete an electrode, in which the plurality of catalyst particles are connected with one another via a plurality of electrolyte clusters, each electrolyte cluster being formed by aggregation of the electrolyte, wherein said step (e) comprises the steps of:
(e-1) coating the surface of the catalyst particles with the electrolyte; and
(e-2) modifying the state of dissolution of the electrolyte in the paste to make the electrolyte deposit in the paste, thereby forming the plurality of electrolyte clusters, in which the electrolyte aggregates.

12. A method in accordance with claim 11, wherein said step (d) comprises the step of: further adding a second solvent, which has sufficiently lower volatility and polarity than those of the first solvent included in the electrolytic solution, in the course of preparing the paste, and wherein said step (e-2) comprises the step of: causing the first solvent included in the electrolytic solution to vaporize first, so as to lower the overall polarity of the mixed solvent in the paste and thereby make the electrolyte deposit in the paste.

13. A method in accordance with claim 12, wherein the electrolyte is a perfluorocarbon sulfonic acid resin.

14. A method in accordance with claim 11, wherein the electrolyte is a perfluorocarbon sulfonic acid resin.

15. A method of manufacturing an electrode for a fuel cell, said method comprising the steps of:

(f) in an electrolytic solution, which is prepared by dissolving an electrolyte in a solvent, modifying the state of dissolution of the electrolyte, so as to make the electrolyte deposit and form a plurality of electrolyte clusters by aggregation of the electrolyte;

(g) mixing a plurality of catalyst particles, which comprise a catalyst at least on surface thereof, with the electrolytic solution comprising the plurality of electrolyte clusters, so as to yield a paste; and (h) drying the paste and causing the surface of the plurality of catalyst particles to be coated with the electrolyte, thereby manufacturing an electrode, in which the plurality of catalyst particles are connected with one another via the plurality of electrolyte clusters.

16. A method in accordance with claim 15, wherein said step (f) comprises the step of: mixing the electrolytic solution with a solvent, which has a sufficiently lower polarity than that of the electrolytic solution, so as to lower the polarity of the electrolytic solution and thereby make the electrolyte deposit.

17. A method in accordance with claim 16, wherein the electrolyte is a perfluorocarbon sulfonic acid resin.

18. A method in accordance with claim 15, wherein the electrolyte is a perfluorocarbon sulfonic acid resin.

* * * * *